H. RUTHENBERG.
APPARATUS FOR MEASURING THE STEAM PASSING THROUGH A PIPE.
APPLICATION FILED JULY 2, 1909.
985,635.
Patented Feb. 28, 1911.
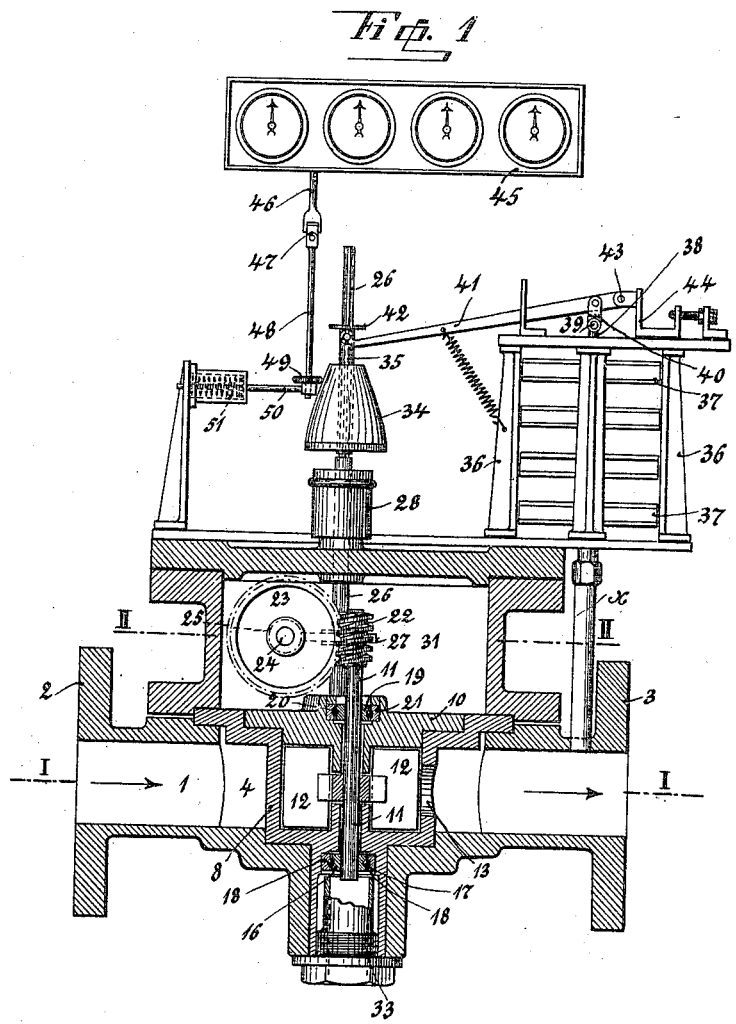

H. RUTHENBERG.
APPARATUS FOR MEASURING THE STEAM PASSING THROUGH A PIPE.
APPLICATION FILED JULY 2, 1909.
985,635.
Patented Feb. 28, 1911.
2 SHEETS—SHEET 2.
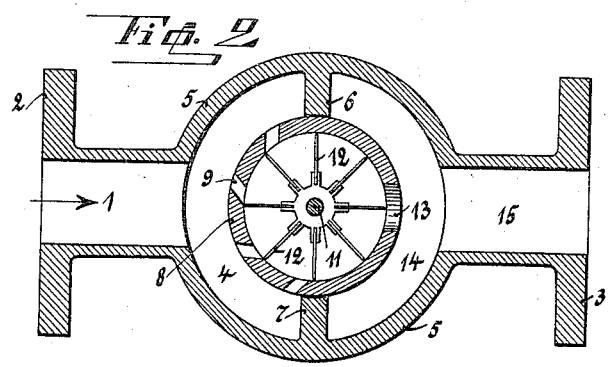
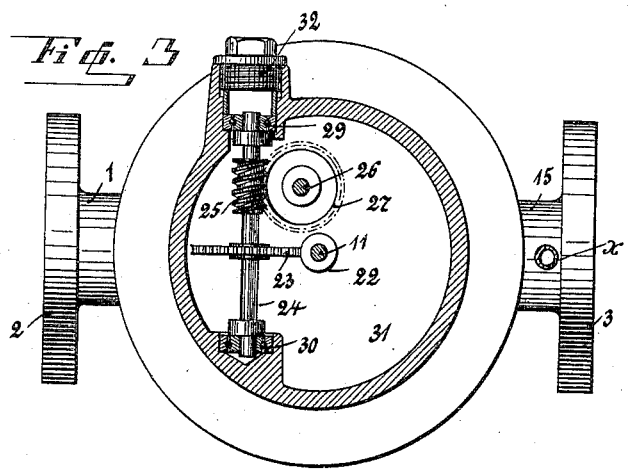
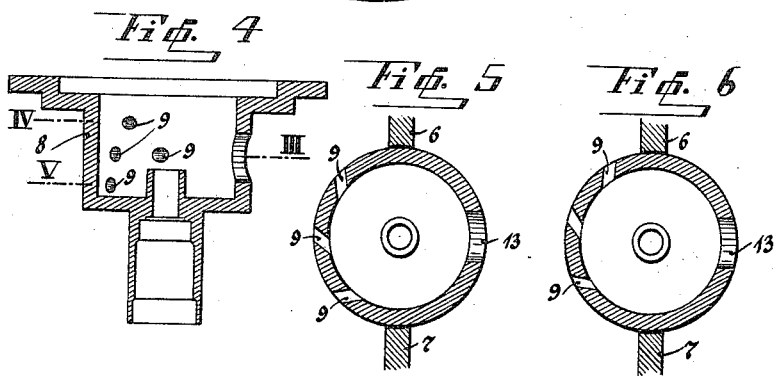
WITNESSES
G. H. Emslie
J. P. Davis
INVENTOR
Hermann Ruthenberg
BY
Munn & Co
ATTORNEYS

UNITED STATES PATENT OFFICE.

HERMANN RUTHENBERG, OF VILLENKOLONIE GRUNEWALD, NEAR BERLIN, GERMANY.

APPARATUS FOR MEASURING THE STEAM PASSING THROUGH A PIPE.

985,635. Specification of Letters Patent. Patented Feb. 28, 1911.

Application filed July 2, 1909. Serial No. 505,573.

*To all whom it may concern:*

Be it known that I, HERMANN RUTHENBERG, a subject of the King of Prussia, residing at No. 52 Königs Allee, in the Villenkolonie Grunewald, near Berlin, German Empire, have invented certain new and useful Improvements in Apparatus for Measuring the Steam Passing Through a Pipe, of which the following is a specification.

My invention relates to improvements in apparatus for measuring the steam passing through a pipe.

The object of the invention is to provide means to rotate a paddle wheel and to hold this wheel, a cone adapted to be rotated by said paddle wheel and an apparatus for adjusting the cone in accordance with the pressure of the steam.

A further object is to provide a preliminary chamber arranged in front of said paddle wheel, and means to uniformly distribute the steam passing from said chamber to said paddle wheel.

A still further object is to provide walls bounding said chamber and provided with channels, through which the steam passes to said paddle wheel and means to provide a suitable bearing and lubrication for said wheel.

These objects are accomplished in the manner and by the means hereinafter described and claimed, reference being made to the accompanying drawings forming a part of this specification and in which similar characters of reference indicate corresponding parts in all the figures.

I am aware that apparatus have been hitherto devised for measuring and registering the entire heat contained in vapors or steam under pressure. Such apparatus are mostly provided with a kind of paddle-wheel, or the like, which is rotated, together with its spindle, by the steam passing through the pipe. The rotation of the spindle is transferred to counting mechanism, so that the total amount of the steam passing through the pipe in a certain unit of time can be measured. Although such apparatus have been known for more than a decennary and although there is doubtless a great demand for the same, especially in all cases where steam power is furnished to various consumers from a central station, no apparatus of the kind are to be found in practical use. This is due to the fact that the apparatus heretofore known are extremely inaccurate in their records, as can very easily be proved. The cause of this inaccuracy is chiefly due to the enormous speed at which the paddle wheel is driven, and to the difficulty of providing a suitable bearing and lubrication for said wheel. The consequent rapid wear and the increased loss of steam entailed thereby, as well as the difficulty of uniformly distributing the steam on the paddle wheel, so that no injurious lateral stresses occur, rendered the use of such apparatus undesirable. All these drawbacks are overcome by the present invention, by which an apparatus is provided, that is not only perfectly accurate in its record, but is also of nearly unlimited durability, while being of the smallest dimensions imaginable and only slightly reducing the pressure of the steam.

Figure 1 is a vertical section through the improvement, Fig. 2 a section on the line I—I of Fig. 1, Fig. 3 a section on the line II—II also of Fig. 1, Fig. 4 a vertical section through a part of the apparatus, Figs. 5 and 6 are sections on the lines III—IV and III—V of Fig. 4.

The apparatus shown is provided with a pipe 1, which is inserted by means of the flanges 2 and 3 into the main, through which the steam to be measured passes in the direction of the arrows. Said steam flows through a preliminary chamber 4 formed by the casing 5 shown in section in Fig. 2 and by two diagrammatically arranged ribs 6, 7, as well as by a hollow casing 8 (Fig. 4). This casing 8, in which the steam inlet openings 9 are provided, is closed at the top by a plate 10, through which the spindle 11 tightly passes. On the spindle 11 is secured the paddle wheel 12 (Fig. 2), which is made as heavy as possible.

The openings 9 are at an angle to the radii and are so provided that the steam is uniformly distributed on the paddle wheel 12. The peculiar step-like arrangement of the openings adapted to obtain the purpose mentioned is evident from Figs. 2, 5 and 6 and forms a chief advantage of the new apparatus.

After passing through the casing 8, the steam, which leaves said casing through the opening 13 and enters into the chamber 14, passes through the part 15 of the pipe 1 and then arrives in the main attached thereto, which, like that on the other side of the apparatus, is not shown in the drawing.

The bearing of the shaft 11 is of special construction so that it will be well adapted to the requirements. On said shaft 11 is secured a collar 16, in which there is a groove to receive the balls 17. Surrounding this collar there is a ring 18, in which a similar groove is formed. A similar bearing is provided in the plate 10, a second collar 19 being secured on the shaft, having a groove for the balls 20 and being surrounded by a similar grooved ring 21.

On the free end of the shaft 11 is keyed a worm 22, which serves to drive gearing consisting of the worm-wheel 23, the shaft 24, a worm 25 secured on said shaft and a worm wheel 27 fastened to the shaft 26. This gearing is intended to reduce the speed at which the spindle 26 is turned, and the low speed enables this spindle to be more easily rendered steam tight than it could at a higher speed, for example at that of the shaft 11. For this purpose the stuffing box 28 is provided. The spindle 24 is journaled in ball bearings 29, 30. In order to obtain the best lubrication possible and to reduce the loss of steam the chamber 31, in which the described gearing is disposed, is filled with oil or other suitable lubricant. A plug 32 enables the chamber 31 to be emptied and opens access to the bearing 29. A similar plug 33 is provided for the bottom bearing of shaft 11.

The means provided for the registration consist of a parabolic cone 34 secured on the sleeve 35. Said sleeve can be moved longitudinally on the spindle 26, but cannot turn independent of said shaft. This end is obtained by providing a longitudinal groove in the spindle, in which a projection attached to the sleeve 35 projects.

The longitudinal movement of the sleeve 35 and therefore that of the cone 34 on the spindle 26 is obtained by a number of combined manometers 37 provided between standards 36. Said manometers are hollow bodies made of thin sheet metal with an elastic bottom, on which the steam pressure from before or behind the pipe 1 is caused to act. For this purpose a branch pipe $x$ connects the steam main with the manometer springs 37.

As will be evident it is of greater advantage for the proprietor of the boiler to arrange the pipe leading to the manometer springs 37 in front of the apparatus, because in that case the loss of pressure occasioned by the measurement is not taken into consideration.

In order to multiply the action of the separate manometer springs 37 several such springs are combined in well known manner, being arranged over each other and connected together by small pipes. To the top spring 37 a device not shown in the drawing is provided, which will enable the lever 38 to be lengthened or shortened. Said lever is moved together with the springs 37 and transfers its motion to a fork 40 connected thereto by the hinge 39. In this fork is journaled a two-armed lever 41 at the free end of which a ring or fork is attached in order to surround the sleeve 35 immediately underneath a circular disk 42. At the opposite end the lever 41 is pivoted to a point 43, which is carried by an adjustable standard 44. When the tension of the steam entering the manometers 37 increases, their elastic bottoms will bulge and the lever 38 will be raised. Likewise the two armed lever 41 and the cone 34 are raised.

The height of the cone 34 is proportional to the expansion of the manometer springs 37. This combined with the fact that the rotation of the spindle 26 is proportional to the quantity of steam passing through the apparatus, enables an accurate record to be taken by counting mechanism 45 of the kind usually employed in gas meters. The spindle 46 of this counting mechanism is connected by a knuckle joint 47 with the spindle 48, on which is provided a friction wheel 49. This friction wheel is pressed against the cone 34 by a spring 51 on the rod 50.

Finally it should be pointed out that steam meters in general, and especially the above described apparatus, have nothing in common with apparatus used for measuring water. If both apparatus could be used for the same purpose then the difficult task of designing a suitable apparatus for measuring steam would have been solved long ago. As this is not the case such a comparison is not permissible.

What I claim and desire to secure by Letters Patent of the United States is:—

1. In an apparatus for measuring steam passing through a main, a casing having an inlet and outlet, a second casing fitting in the first casing and having a plurality of inlet openings in one side and an outlet opening in the other side, oppositely arranged partitions in the space between the casings and forming front and rear chambers, a paddle wheel in the second casing, an indicating device, and means for operating the indicating device from the paddle wheel.

2. In an apparatus for measuring steam passing through a main, a casing having an inlet and outlet, a second casing fitting in the first casing and having a plurality of inlet openings in one side and an outlet opening in its other side, partitions in the space between the casings and forming front and rear chambers, a chamber above the said chambers and adapted to contain a lubricant, a paddle wheel mounted in the second casing and having its shaft extending into the chamber containing lubricant, a shaft mounted in the last named chamber, gearing in the said chamber between the said shaft and the paddle wheel shaft, an indicating device, and means for operating the indicating device from the said shaft.

3. In an apparatus for measuring steam passing through a main, a casing having an inlet and an outlet, a second casing fitting in the first casing and having a plurality of inlet openings in one side and an outlet opening in its other side, partitions in the space between the casings and forming front and rear chambers, a chamber above the said chambers and adapted to contain a lubricant, a paddle wheel mounted in the second casing and having its shaft projecting into the chamber for lubricant, a shaft mounted in the last named chamber, gearing in the said chamber, between the said shaft and the paddle wheel shaft, an indicating device, means for operating the indicating device from the said first shaft, and means for controlling the operating means according to the pressure of the fluid.

4. In an apparatus for measuring steam passing through a main, a casing having an inlet and outlet and provided with oppositely arranged ribs on its inner face, a second casing fitting in the first casing and forming therewith a front and rear chamber, said casing having a plurality of inlet openings in one side and an outlet opening in the other side, a paddle wheel mounted in the second casing, an indicating device, means for operating the indicating device from the paddle wheel, and means for controlling the operating means according to the pressure of the fluid.

5. In an apparatus for measuring steam passing through a main, a casing having an inlet and outlet, a second casing in the first casing and having an inlet and outlet, a paddle wheel mounted in the second casing, a lubricating chamber above the second casing and into which the shaft of the paddle wheel projects, an indicating device, a cone, means for operating the indicating device from the cone, means for adjusting the cone in accordance with the pressure of steam, and gearing in the lubricating chamber for operating the cone from the paddle wheel at reduced speed.

6. In an apparatus for measuring steam passing through a main, a casing having an inlet and outlet and provided with oppositely arranged ribs on its inner face, a second casing in the first casing and forming therewith a front and rear chamber, said casing having a plurality of inlet openings in one side and an outlet opening in its other side, a paddle wheel mounted in the second casing, a lubricating chamber above the said second casing and into which the shaft of the paddle wheel projects, an indicating device, a cone, means for operating the indicating device from the cone, means for adjusting the cone in accordance with the pressure of steam, and gearing in the lubricating chamber for operating the cone from the paddle wheel.

7. The described apparatus, comprising in combination, a paddle wheel, a spindle, gearing adapted to transfer the rotation of said paddle wheel to said spindle at a reduced speed, a cone of parabolic form adapted to slide longitudinally on, and to be rotated by, said spindle, manometers, an adjustable support, a lever pivoted to the support, means for pivotally connecting the lever with the manometers, means connecting the lever with the cone to move said cone on said spindle in accordance with the pressure of the steam, a friction wheel, means for pressing the friction wheel against said cone, and counting mechanism adapted to be driven by said friction wheel, substantially as, and for the purpose, set forth.

In witness whereof I have hereunto set my hand in presence of two witnesses.

HERMANN RUTHENBERG.

Witnesses:
 FRANZ SCHWENTERLEY,
 HENRY HASPER.

---

Copies of this patent may be obtained for five cents each, by addressing the "Commissioner of Patents, Washington, D. C."